3,455,977
COMPLEXES OF $B_{11}H_{14}^-$ AND $B_{11}H_{13}^{2-}$

Frank K. Klanberg and George W. Parshall, Wilmington, Del., assignors to E. I. du Pont de Nemours and Company, Wilmington, Del., a corporation of Delaware
No Drawing. Filed Dec. 13, 1966, Ser. No. 601,308
Int. Cl. C07f 1/08, 1/12
U.S. Cl. 260—430                                                  6 Claims

ABSTRACT OF THE DISCLOSURE

Complexes selected from those represented by the formulas (1) $\quad\quad\quad\quad (R_3P)_3MB_{11}H_{14}$ and (2) $\quad\quad\quad\quad [(R_3P)_4Ag]_2B_{11}H_{13}$ wherein M is either copper or gold and each R is aryl or alkaryl. The compounds are prepared by reacting a salt of $B_{11}H_{14}^-$ with a salt of the metal M in the presence of the phosphine and an inert solvent. The compounds are useful in depositing metal films on substrate surfaces.

---

This invention relates to novel metal-organic compounds. More specifically, it concerns complexes of $B_{11}H_{14}^-$ or $B_{11}H_{13}^{2-}$ with selected metals and phosphines, and to a method for their preparation.

The novel complexes of this invention are compounds selected from those represented by the formulas (1) $\quad\quad\quad\quad (R_3P)_3MB_{11}H_{14}$ and (2) $\quad\quad\quad\quad [(R_3P)_4Ag]_2B_{11}H_{13}$ wherein M is a metal selected from the group consisting of copper and gold; and each R is of 6–12 carbon atoms selected from the class consisting of aryl and alkaryl.

The novel complexes of this invention are prepared by reacting a soluble polyboron salt of the formula $M'B_{11}H_{14}$ wherein M' is alkali metal or $R_n'NH_{4-n}$ wherein $n$ is a cardinal number of 0–4 inclusive and R' is lower alkyl, with a soluble salt of the metal M in the presence of the phosphine, $R_3P$, and an inert medium.

The salt of the metal M can be represented by the formulas $CuX_2$, $AgX_2$, $AuX_3''$ and $M''AuX_4''$ wherein X is one equivalent of an anion selected from the class consisting of chloride, bromide, nitrate, sulfate, formate, acetate, lactate and tartrate; X' is selected from the class consisting of acetate, nitrate and fluoride, and X" is selected from the class consisting of chloride and bromide.

For convenience, the process is usually carried out at room temperatures, e.g. 20–30° C., or slightly higher temperatures, e.g., up to 50° C. The latter range is sometimes useful for effecting increased dissolution of some of the reactants. The temperature range, however, is not critical and higher or lower temperatures may be used, but present no advantage.

The R' groups in the cation $R_n'NH_{4-n}$ can be the same or different and the cations are represented by tert-butylammonium, diisopropylammonium, triethylammonium, tetramethylammonium, and the like.

Pressure is not critical and solely for convenience, atmospheric pressure is ordinarily employed.

Nor is the ratio of reactants critical. Usually, for optimum results, approximately stoichiometric ratios are used. As seen in the examples, the order of addition of the reactants is not critical and they can be combined in any sequence or all mixed together simultaneously.

Operable solvents include water, polar organic solvents that are at least partially miscible with water, and mixtures of the two. Examples of such polar solvents include lower alkanols such as methanol, ethanol and isopropyl alcohol; cyclic ethers such as dioxane and tetrahydrofuran; open-chain polyethers such as 1,2-dimethoxymethane and di(2-ethoxyethyl)ether; and lower alkanenitriles such as acetonitrile and propionitrile.

All products of the invention are relatively insoluble in the reaction medium and usually precipitate immediately when all the reactants are in mutual contact. The product can then be isolated by filtration and purified by recrystallization as shown in the examples.

The reactants $CsB_{11}H_{14}$, $RbB_{11}H_{14}$, $(CH_3)_3NHB_{11}H_{14}$, and $(C_2H_5)_3NHB_{11}H_{14}$ can be prepared as described in Aftandilian et al., Inorg. Chem. 1, 736 (1962). Ammonium, other alkali-metal, and other substituted ammonium $B_{11}H_{14}^-$ salts which make up the reactants in the process of this invention are prepared from the cesium or rubidium $B_{11}H_{14}^-$ salt by conventional cation exchange techniques.

Representative phosphines ($R_3P$), both as reactants and complexed ligand groups in the compounds of the invention, include triphenylphosphine, tritolylphosphine (o-, m- and p-), tris(2,5-xylyl)phosphine, tris(2,4,6-trimethylphenyl) phosphine, phenyldi-p-tolylphosphine, diphenyl-p-tolylphosphine, tris(1-naphthyl)phosphine, tris (biphenylyl)phosphine, and the like.

The novel complexes of this invention are crysalline solids. Their infrared absorption spectra indicate that the metal M is bonded directly to boron of the polyboron nucleus, and is not bonded to the hydrogen of the polyboron nucleus.

The products and process of this invention are illustrated in greater detail in the following examples:

Example 1.—$[(C_6H_5)_3P]_3CuB_{11}H_{14}$

A mixture of 7.8 g. of triphenylphosphine and 1.6 g. of copper sulfate in 180 ml. of ethanol and 50 ml. of water was stirred with a solution of 3 g. of $CsB_{11}H_{14}$ in 70 ml. of a 1:1 by volume mixture of water and ethanol. A cream-colored solid precipitate formed which was collected and taken up in 150 ml. of tetrahydrofuran, with warming, to yield a yellow solution. Concentration of this solution gave 5.5 g. of a solid which was separated. The product was recrystallized three times from a 1:1 by volume mixture of benzene and 1,2-dimethoxyethane to give 1 g. of $[(C_6H_5)_3P]_3CuB_{11}H_{14}$ which decomposed between 205–220° C.

*Analysis.*—Calcd. for $C_{54}H_{59}B_{11}CuP_3$: C, 66.0; H, 6.1; B, 12.1; Cu, 6.5. Found: C, 65.1; H, 6.4; B, 12.4; Cu, 6.3.

The infrared absorption (KBr wafer) showed one B–H absorption band at 2550 cm.$^{-1}$ (terminal hydrogen).

Example 2.—$[(C_6H_5)_3P]_3AuB_{11}H_{14}$

A solution of $NaAuCl_4 \cdot 2H_2O$ (3.3 g.) in 40 ml. of ethanol was added to a mixture of triphenylphosphine (6.5 g.) and $CsB_{11}H_{14}$ (2.6 g.) in 160 ml. of warm ethanol and 10 ml. of water. A solid precipitated. The solid was isolated by filtration and recrystallized three times from 1,2-dimethoxyethane. The final product consisted of white crystals of $[(C_6H_5)_3P]_3AuB_{11}H_{14}$ which yellowed at 195° C. and decomposed at 217–218° C.

*Analysis.*—Calcd. $C_{54}H_{59}AuB_{11}P_3$: C, 58.1; H, 5.3; P, 8.3; B, 10.7; Au, 17.6. Found: C, 57.7; H, 5.7; P, 7.7; B, 10.2; Au, 17.1.

The infrared absorption spectrum showed one B–H absorption band at 2515 cm.$^{-1}$ (terminal hydrogen).

Example 3.—$[(C_6H_5)_3P]_4Ag]_2B_{11}H_{13}$

Solutions of 15 g. of triphenylphosphine in 150 ml. of ethanol and 2 g. of $CsB_{11}H_{14}$ in 20 ml. of ethanol and 20 ml. of water were combined, and the resulting mixture was added with stirring to a solution of 1.7 g. of silver nitrate in 10 ml. of ethanol and 10 ml. of water. A white solid precipitated. It was separated by filtration and dissolved in 100 ml. of tetrahydrofuran. When this solution was chilled in ice, a crystalline solid precipitated. It was separated by filtration and dried to give 3.6 of $$[[(C_6H_5)_3P]_4Ag]_2B_{11}H_{13}$$

The product decomposed at 180° C. after browning slightly at 165–168° C.

*Analysis.*—Calcd. for $C_{144}H_{133}Ag_2B_{11}P_8$: C, 70.7; H, 5.5; Ag, 8.8; B, 4.9. Found: 68.8; H, 5.4; Ag, 8.2; B, 4.8.

The infrared absorption spectrum of the product (KBr wafer) showed one sharp band at 2550 cm.$^{-1}$ (terminal hydrogen).

An additional 4.0 g. of product was obtained when the mother liquor was concentrated to about one-half of its original volume. Its infrared absorption spectrum and melting behavior were indentical with those of the first fraction.

By employing the procedure set forth in the foregoing examples, all the compounds of this invention can be prepared.

The compounds of this invention are useful in the deposition of metal films on a substrate surface. For example, a glass vessel containing a solution of about 0.05 g. of $[(C_5H_5)_3P]_3AuB_{11}H_{14}$ in 5 ml. of dimethyl sulfoxide was warmed gently to about 100° C. A thin film of metallic gold was deposited on the wall of the vessel that was in contact with the solution.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds represented by the formula selected from those of the class consisting of $$(R_3P)_3MB_{11}H_{14}$$

and $$[(R_3P)_4Ag]_2B_{11}H_{13}$$

wherein M is selected from the class consisting of copper and gold; and each R is of 6–12 carbon atoms selected from the class consisting of aryl and alkaryl.

2. Compounds of claim 1 wherein R is aryl.
3. Compounds of claim 1 wherein R is phenyl.
4. The compound of claim 1 having the formula $$[(C_6H_5)_3P]_3CuB_{11}H_{14}$$

5. The compound of claim 1 having the formula $$[(C_6H_5)_3P]_3AuB_{11}H_{14}$$

6. The compound of claim 1 having the formula $$[[(C_6H_5)_3P]_4Ag]_2B_{11}H_{13}$$

References Cited

UNITED STATES PATENTS

| 3,217,023 | 11/1965 | Miller | 260—430 XR |
| 3,296,260 | 3/1967 | Knoth | 260—430 XR |
| 3,328,422 | 6/1967 | Knoth | 260—430 XR |

OTHER REFERENCES

Cariati et al.: Gazz. Chim. Ital., vol. 95, pp. 3–15 (1965).
Davidson: Chemistry & Industry, (1964), pp. 2021–22.
Cariati et al.: Gazz Chim. Ital. vol. 95, pp. 201–205 (1965).

TOBIAS E. LEVOW, Primary Examiner
H. M. S. SNEED, Assistant Examiner

U.S. Cl. X.R.

117—107.2, 124; 260—438.1